US012546578B2

(12) United States Patent
Skorczewski

(10) Patent No.: US 12,546,578 B2
(45) Date of Patent: Feb. 10, 2026

(54) COUNTERMEASURE DEVICE

(71) Applicant: BAE SYSTEMS PLC, London (GB)

(72) Inventor: Leon Skorczewski, Preston (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/266,368

(22) PCT Filed: Dec. 2, 2021

(86) PCT No.: PCT/GB2021/053144
§ 371 (c)(1),
(2) Date: Jun. 9, 2023

(87) PCT Pub. No.: WO2022/123218
PCT Pub. Date: Jun. 16, 2022

(65) Prior Publication Data

US 2024/0044626 A1 Feb. 8, 2024

(30) Foreign Application Priority Data

Dec. 10, 2020 (GB) ...................................... 2019446

(51) Int. Cl.
*F42B 12/70* (2006.01)
*B64D 1/08* (2006.01)

(52) U.S. Cl.
CPC ................ *F42B 12/70* (2013.01); *B64D 1/08* (2013.01)

(58) Field of Classification Search
None
See application file for complete search history.

(56) References Cited

U.S. PATENT DOCUMENTS

| | | | | | |
|---|---|---|---|---|---|
| 1,434,681 | A * | 11/1922 | Clay | F42B 12/44 | 102/364 |
| 2,958,277 | A * | 11/1960 | Snelling | F42B 12/44 | 86/20.12 |
| 3,433,437 | A * | 3/1969 | Bates | F42B 10/16 | 244/3.29 |
| 3,841,219 | A * | 10/1974 | Schillreff | H04K 3/825 | 367/1 |

(Continued)

FOREIGN PATENT DOCUMENTS

| | | |
|---|---|---|
| CN | 104111006 A | 10/2014 |
| EP | 0020217 A1 | 12/1980 |

(Continued)

OTHER PUBLICATIONS

International Search Report dated Feb. 28, 2022 issued in PCT/GB2021/053144.
GB Search Report dated Apr. 21, 2021 issued in GB 2019446.0.

*Primary Examiner* — Derrick R Morgan
(74) *Attorney, Agent, or Firm* — Scully, Scott, Murphy & Presser, P.C.

(57) ABSTRACT

A laser weapon countermeasure device is described. The laser weapon countermeasure device comprises a sealed capsule having a filler disposed therein. The filler comprises either: a reflective particulate metal; or a precursor for a reflective metal or reflective metal alloy. The capsule is configured to burst in air such that the filler disperses into an aerosol. A countermeasure launcher and a vehicle comprising a countermeasure launcher are also described.

11 Claims, 5 Drawing Sheets

(56) References Cited

U.S. PATENT DOCUMENTS 3,899,975 A * 8/1975 Lawrence ............... F42B 12/70 102/505
3,970,003 A * 7/1976 Hayward .................. F42B 4/26 102/336
4,167,009 A * 9/1979 Schwartz ................ F42B 12/70 102/351
4,307,665 A * 12/1981 Block ..................... F42B 12/70 342/12
4,328,117 A * 5/1982 Godefroy .................. F41H 9/06 516/4
4,406,227 A * 9/1983 Beeker .................... F42B 12/70 102/393
4,498,392 A * 2/1985 Billard ...................... F42B 5/15 102/357
4,522,126 A * 6/1985 Bell .......................... F42B 5/15 102/370
4,704,966 A * 11/1987 Sellman ................... C06D 3/00 102/505
4,704,967 A * 11/1987 Milstead .................. C06D 3/00 102/505
4,726,295 A * 2/1988 Embury, Jr. ............ F42B 12/70 102/482
4,880,483 A * 11/1989 Baldi ................... B65D 43/022 149/6
4,899,662 A * 2/1990 Santalucia .............. F42B 12/70 220/4.01
5,117,731 A * 6/1992 Mendenhall .......... B63B 22/003 89/1.816
5,168,123 A * 12/1992 Lee ......................... F42B 12/52 102/365
5,331,897 A * 7/1994 Handler .................... F41H 9/00 102/370
5,499,582 A * 3/1996 Schiessl .................... F42B 4/06 102/285
5,501,751 A * 3/1996 Baldi ...................... C06C 15/00 102/335
5,531,930 A * 7/1996 Karton ..................... C06D 3/00 516/1
5,631,441 A * 5/1997 Briere ....................... F42B 5/15 102/370
6,412,416 B1 * 7/2002 Rouse ....................... F42B 5/15 102/370
6,782,826 B1 * 8/2004 O'Dwyer .................. F42B 5/15 102/341
7,089,842 B1 * 8/2006 Herbage ................... F41F 3/10 89/1.8
7,895,931 B2 * 3/2011 Gaigler ..................... F41G 3/04 102/505
7,903,019 B2 * 3/2011 Frick ....................... F42B 12/70 342/12
8,245,640 B1 * 8/2012 Sutherland ............. F42B 12/50 102/363
8,250,979 B2 * 8/2012 Neff ........................ F42B 5/155 102/202.14
8,490,532 B2 * 7/2013 Barlow ................... F41A 23/24 89/1.41
8,813,652 B2 * 8/2014 Shin .......................... F42B 8/02 102/513
9,052,175 B1 * 6/2015 Calvert ................. F42C 13/047
10,059,637 B2 * 8/2018 Luan ....................... C06C 15/00
10,871,348 B2 * 12/2020 Zätterqvist ............... B64D 1/02
11,053,007 B1 * 7/2021 Mills ......................... F42B 4/26
11,999,483 B2 * 6/2024 Bystroem ................. F41F 7/00
2006/0042417 A1 * 3/2006 Gash ......................... C22B 5/12 75/415
2017/0023342 A1 1/2017 Fix et al.
2017/0284780 A1 * 10/2017 Clemen, Jr. ............. F42B 15/01
2018/0111149 A1 * 4/2018 Drexler ................... F42B 12/50
2019/0168896 A1 * 6/2019 Drexler .................... G21H 7/00
2019/0339049 A1 * 11/2019 Rastegar ................... F42B 5/15
2020/0166311 A1 * 5/2020 Kolanek ................ G05D 1/106
2020/0407288 A1 * 12/2020 Davis ...................... C06C 15/00
2021/0404783 A1 * 12/2021 Branch ................... F41A 17/06

FOREIGN PATENT DOCUMENTS

JP 2018066553 A 4/2018
WO 2010097620 A1 9/2010

* cited by examiner

COUNTERMEASURE DEVICE

FIELD

The present disclosure relates to a laser weapon countermeasure device and a launcher for the same. The present disclosure also relates to a vehicle comprising the launcher.

BACKGROUND

Laser directed energy weapons are in development for use on vehicles, including air, land and sea-going vehicles, and in ground installations. These weapons use lenses and mirrors to collimate high-powered laser beams that burn through the skin of target vehicles. Once the skin of the target vehicle has been pierced, the laser beam may in turn injure people inside the target vehicle, rupture fuel tanks, or cause ordnance to explode. In some cases, the energy of the laser beam is intense enough to cause the target vehicle to explode on impact.

Chaff is a material used to deflect EM waves, with a wavelength of about between 0.75 cm and 4 cm, transmitted by a radar emitter. It comprises small conductive fibres, such as aluminium foil, strips or wire. The material is contained in canisters on a target vehicle. The canisters use a pyrotechnic charge that forces the chaff out of the canister and into the airflow to form a cloud in the path of the incoming EM waves. The chaff acts to reflect the EM waves such that the target vehicle is obfuscated from a radar receiver by the cloud.

Traditional chaff would not impede a laser beam such that those generated by laser weapons, with a wavelength of about between 100 nm and 800 nm, to an effective extent. Further, laser weapons do not rely on reflected signals to track and/or attack the target vehicle. Therefore, chaff, without modification, is not an effective countermeasure to a laser weapon.

Therefore, there is a need for an inexpensive and easy to manufacture countermeasure to laser weapons.

SUMMARY

According to a first aspect of the present disclosure, there is provided a laser weapon countermeasure device, comprising:

a sealed capsule having a filler disposed therein, the filler comprising either:

a reflective particulate metal; or a precursor for a reflective metal or reflective metal alloy, wherein the capsule is configured to burst in air such that the filler disperses into an aerosol.

Advantageously, the countermeasure device generates a cloud of reflective particulate metal that deflects, reflects or otherwise disrupts a laser beam. Further, the resulting cloud of reflective particulate metal may cause damage to a laser emitter if it makes contact with the emitter's lens.

The particulate metal, metal or metal alloy may be highly heat conductive.

The filler may comprise a liquid, and the particulate metal may be soluble in said liquid. Alternatively, the filler may comprise a gas, and the sealed capsule may be pressurised. For example, the capsule is pressurised to a pressure greater than 1 atmosphere.

The particulate metal may comprise one of zinc, nickel, copper or silver particles. The particulate metal may comprise a metal powder. Alternatively, the particulate metal may comprise metal micrograins or filaments. The particulate metal may comprise metal-coated non-conductive particles.

The precursor may be selected from a group that forms a reflective metal or reflective metal alloy when exposed to light. The capsule may be opaque to light. The precursor may comprise one of triethyl aluminium, a pyrophoric organometallic molecule, or a metal hydride. The precursor may comprise silver halide.

The laser weapon countermeasure device may comprise an explosive charge arranged to cause the capsule to burst at one of a predetermined altitude, time of flight, or distance travelled.

The laser weapon countermeasure device may comprise a deployable retardation device arranged to, in use, slow the descent of the countermeasure device.

An inside surface of the capsule may be at least partly coated in a reflective material.

The wall of the capsule may have a thickness of between about 10 and 30 micrometres. The wall of capsule is the skin or containment structure of the capsule, i.e. the main body.

The wall of the capsule may be formed of a dielectric insulator.

The capsule may have a length of about 50 mm.

According to a second aspect of the present invention, there is provided a countermeasure launcher, the countermeasure launcher comprising a plurality of laser weapon countermeasure devices according to the first aspect and an ejection means.

The countermeasure launcher may comprise a chamber having at least one cartridge disposed therein, wherein the or each cartridge comprises a plurality of laser weapon countermeasure devices. Each cartridge may be independently ejectable from the chamber.

According to a third aspect of the present invention, there is provided a vehicle comprising the countermeasure launcher according to the second aspect. The vehicle may comprise an aircraft.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the disclosure will now be described by way of example only and with reference to the accompanying drawings, in which.

For convenience and economy, the same reference numerals are used in different figures to label identical or similar elements.

DETAILED DESCRIPTION

Generally, embodiments herein relate to a countermeasure for deployment in response to a laser weapon threat. When deployed, the countermeasure provides the effect of dissipating (i.e. reducing spot intensity), or at least disrupting (i.e. deflecting, or changing the path), an incoming laser beam. In other words, the countermeasure prevents a laser beam from striking its intended target. Further, the countermeasure may cause damage to the laser beam emitter. These effects are achieved by dispersing a dense cloud of fine metal particles in the path of the laser beam.

Figure 1:
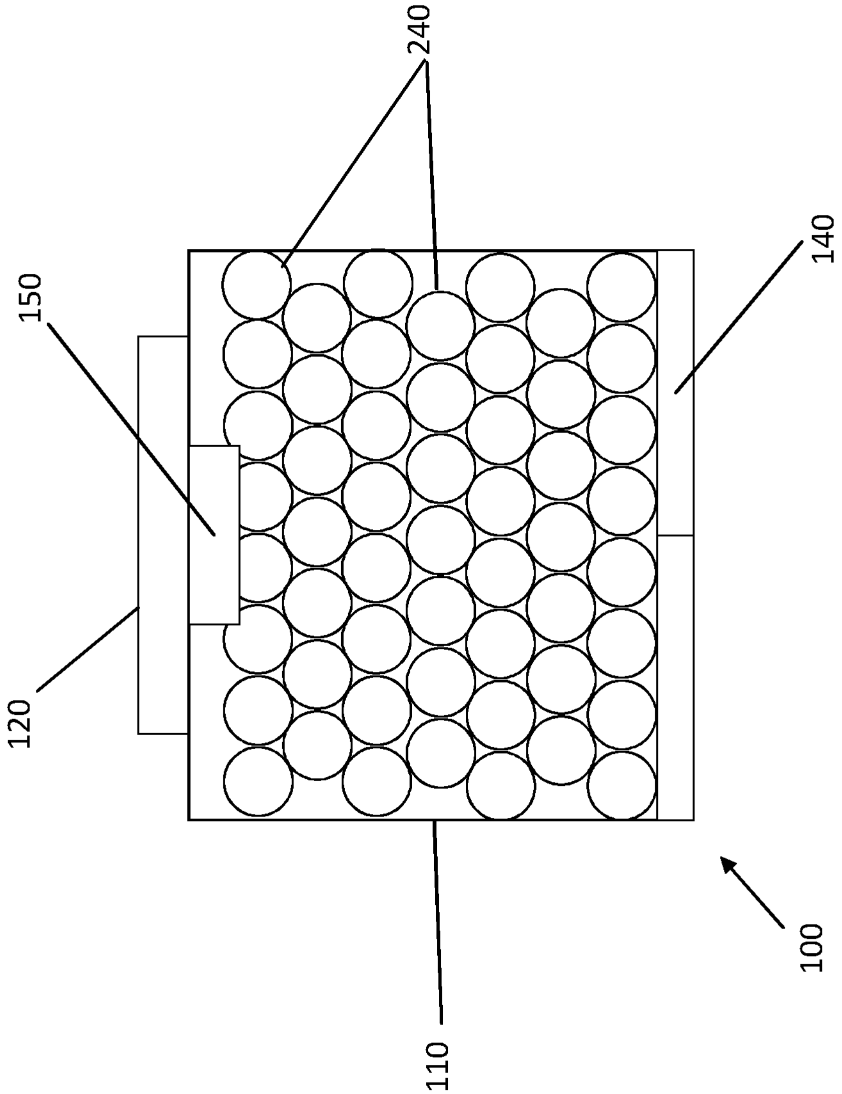
FIG. 1 shows a countermeasure dispenser for use in disrupting an incoming laser beam.

A countermeasure dispenser 100 will now be described with reference to FIG. 1. The countermeasure dispenser 100 may be a chaff dispenser as found in the prior art. The dispenser 100 comprises a chamber 110 for receiving a plurality of countermeasure devices 240. The countermeasure devices 240 will be described in more detail with reference to FIGS. 2*a* and 2*b*. The dispenser 100 comprises attachment means 120 for attaching the dispenser 100 to a vehicle (for example, an aircraft).

The attachment means 120 may releasably couple the chamber 110 to the vehicle, or alternatively the chamber 110 may be integrated into the structure of the vehicle itself. Although the chamber 110 is shown as rectangular in FIG. 1, it will be appreciated that other shaped configurations of the chamber 110 are possible, such as cylindrical. The chamber 110 may be arranged to hold significant numbers of countermeasure devices 240 (e.g. hundreds of thousands of individual countermeasure devices 240). FIG. 1 is not intended to restrict the countermeasure devices 240 to being stored in a regular pattern as this is for illustration only, and furthermore FIG. 1 is not intended to indicate scale or quantity.

A release means 140 is provided for dispensing the countermeasure devices 240 out of the chamber 110. The release means 140 may be an operable chamber opening (i.e. a door, or hatch). The release means 140 may comprise any suitable mechanical or electrically controlled release mechanism. The release means 140 may be manually activated, such as upon input from the pilot, or may be automatically activated, such as upon detection of radar signals or a laser beam impinging on the vehicle, the vehicle achieving a predetermined velocity or altitude, or upon determining a location of the vehicle to be within a particular region (e.g. an area above or around a known laser weapon).

The chamber 110 may further comprise an ejection means 150 for ejecting the countermeasure devices 240 out of the chamber 110, such as via mechanical or pyrotechnical methods. For example, methods may include dispersing the countermeasure devices 240 via an actuator, a burst charge, a gas propellant, or any other suitable dispersion means.

In an alternative embodiment, the chamber 110 is filled with a plurality of hollow cartridges, each having openings facing the opening of the chamber 110. Each of these cartridges comprises a plurality of countermeasure devices 240 as will be later described. Each cartridge is provided with an ejection means for forcing the countermeasure devices 240 out of the respective cartridge. Alternatively, one ejection means 150, as described above, may drive the countermeasure devices 240 from all of the cartridges at once. In further embodiments still, the cartridges may be driven from the chamber 110. Here, the cartridges are equipped with an explosive charge to detonate and release the countermeasure devices 240 a predetermined time after release, or at a predetermined distance from the vehicle.

Figure 2A:
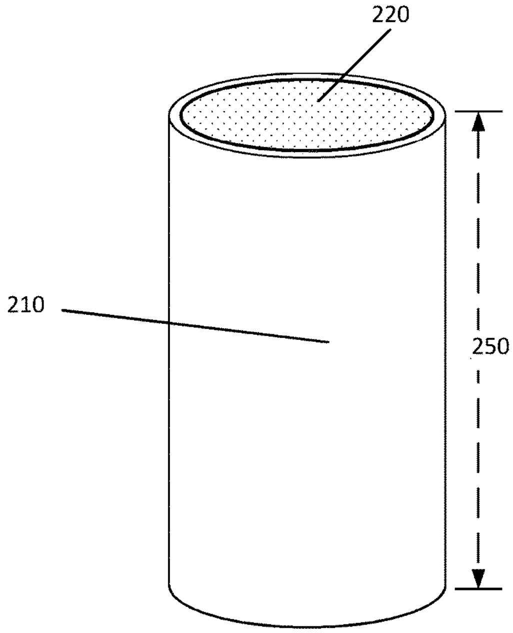
FIG. 2*a* shows a sectional view of a countermeasure.
Figure 2B:
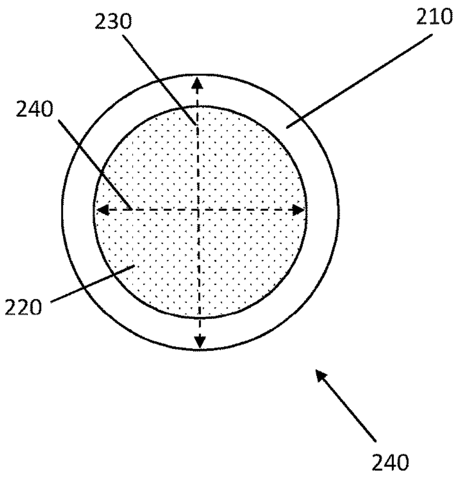
FIG. 2*b* shows a plan view of the countermeasure.

FIGS. 2*a* and 2*b* show, respectively, a sectional and plan view of a countermeasure device 240. The countermeasure device 240 comprises a microcapsule 210. The microcapsule 240 is a hollow fibre material, sealed at both ends. In some embodiments, the microcapsules 210 are made from a lightweight non-conductive or insulating material, such as a dielectric insulator like a glass, ceramic or plastic. Using a non-conductive (e.g. electrically non-conductive) material tends to prevent the risk of electrostatic charge building up between countermeasure devices 240 and therefore reduces clumping, and tends to mitigate the risk of short-circuit when the countermeasure devices 240 are ejected. The outer surface of the microcapsule 210 may also be at least partly coated with an antistatic coating to aid in reducing clumping and therefore improve dispersion upon release from the chamber 110 (or cartridge).

In some embodiments, the inner surface of the microcapsule 210 is at least partly coated with a conductive substance. For example, all of the inner surface, or greater than about 50% (for example greater than about 60, 70, 80, 95, 96, 97, 98 or 99%) of the inner surface, may be coated with the conductive substance.

The inner surface coating may be applied through any suitable method, such as through the electroless metal deposition method described in earlier patent publication WO 2010/097620. Preferably, the inner surface coating, i.e. the conductive substance, is electroplated. The conductive substance may comprise any suitable material capable of reflecting microwave energy. For example, the conductive material may be a metal, such as aluminium, silver, nickel, copper, zinc, gold, or iron, tin, chromium, indium, gallium, or a metal alloy thereof. Alternatively, the conductive substance may be a conducting non-metal, such as graphite or graphene. By coating the inner surface with a conductive material, the inner surface reflects incoming radar waves and therefore assists in the disruption of radar systems, as laser weapons may employ radars to provide targeting capability. However, by coating only the inner surfaces of otherwise non-conductive microcapsules 210, issues with high material weight and clumping tend to be avoided. Furthermore, as the outer surface is still non-conductive, issues with causing short circuits tend to be avoided. In other embodiments, for example where the countermeasure device 240 is not also intended to defeat radar targeting systems, the inner surface coating may not be provided.

The length 250 of the microcapsules 210 may be tuned to provide maximum radar interference. In this way, the countermeasure devices 240 may be suitable not only for the primary purpose of disrupting laser beams, but also for disrupting radar waves to prevent target lock by the attacking platform. For example, the microcapsules 210 may be cut to a length 250 corresponding to radio frequency (RF) wavelengths of interest. The microcapsules 210 may be cut to a length 250 corresponding to half of a radar signal's wavelength, thereby causing the conductive material of the microcapsule 210 to resonate when hit by a radar signal and re-reradiate the signal. The microcapsules 210 may also be cut to a length 250 corresponding to a multiple of the wavelength of interest. The chamber 110 may comprise microcapsules 210 tuned to multiple lengths in order to provide effective countermeasure against a radar system transmitting EM signals with a plurality of wavelengths. Alternatively, the chamber 110 may hold individual cartridges each containing a different of length of microcapsule 210. Examples include microcapsules 210 having lengths 250 of about 5-50 mm, for example about 5 mm, 7.5 mm, 10 mm, 15 mm, 20 mm, 25 mm, 30 mm, 35 mm, 40 mm, 45 mm and/or 50 mm, although other lengths may be utilised. For high frequency radar systems, the microcapsules 210 may have very short lengths of about 100-1000 microns e.g. about 100, 200, 300, 400, 500, 600, 700, 800, 900 and/or 1000 microns.

Preferably, where the countermeasure devices 240 are primarily intended to protect a target from laser beams, longer microcapsules 210 are preferred. For example, microcapsules 210 of about 50 mm or more in length are preferred. This increases the chance that the microcapsule 210 will be struck by the laser beam and provides more internal volume for filler material.

The microcapsule 210 may have a nominal outer diameter 230 of less than about 150 microns, for example about 30-100 microns, about 40-90 microns, about 50-80 microns, preferably about 70 microns, although other nominal outer diameters are envisaged. The microcapsule 210 may have a nominal internal diameter 240 of less than about 60 microns, for example about 1-58 microns, 10-50 microns, about 15-40 microns, preferably about 25-30 microns, although other internal diameters are envisaged. The nominal internal diameter 240 may be greater than about 50% of the nominal outer diameter 230, for example greater than about 60, 70, 75, 80, 85, 90 or 95%.

The inner surface coating may have a thickness of at least about 100 nm (for example at least about 200 nm, 300 nm, 400 nm, 500 nm, 1000 nm, 2000 nm, 5000 nm). Alternatively, the inner surface coating may have a thickness of less than about 100 nm, less than about 50 nm, less than about 10 nm, less than about 1 nm, or less than about 0.5 nm. Preferably, the inner surface coating has a thickness ranging from about 10 nm to 5000 nm. Preferably, the inner surface coating is intentionally applied in the production of the microcapsules 210. As such, it is preferable that the inner coating has a controlled thickness.

In other words, the total thickness of the wall of a microcapsule 210 is in the region of 10-30 um, which is optimal for maintaining the integrity of the microcapsule 210 during storage and manufacture while allowing heat to be readily transferred through the wall to excite a filler 220 contained therein or melt the skin of the microcapsule 210.

While the microcapsule 210 is illustrated as being open-ended, this is for illustrative purposes only. The microcapsule 210 is filled with a filler 220 material. The filler 220 is sealed into the microcapsule 220 during manufacture of the microcapsule 210. For example, one end of the microcapsule 210 may be capped or crimped before the filler 220 is poured in and the other end may be capped or crimped after the filler 220 is poured in. The ends of the microcapsule 210 may be heat sealed, glued, or otherwise sealed to be air tight. In an alternative embodiment, the filler 220 is injected into a sealed microcapsule 210 and the injection hole plugged afterwards.

In one embodiment, the filler 220 comprises a light-sensitive metallic precursor, or a metallic precursor reactive with air. In other words, when exposed to air or light, the precursor forms a reflective metal or metal alloy, for example silver. The filler 220 may therefore be Triethyl aluminium, pyrophoric organometallic molecules, or a metal hydride (which decompose to leave metals). For example, the precursor used in the filler 220 may be silver halide, which is a chemical commonly used in photography development. Another example of an appropriate precursor is silver chloride. Where the precursor is light-sensitive, the microcapsule 210 skin may be formed of or coated in an opaque material.

In another embodiment, the filler 220 comprises an aqueous metal colloidal solution. In other words, the filler 220 comprises metal (or metallic) particles suspended in a liquid. The metal particles may comprise powder, micrograins or filaments. The metal particles may comprise metal-coated non-conductive particles, such as carbon nanotubes, glass, or polymers. For example, the filler 220 may comprise metal-coated glass microbeads. The liquid may be water, which is one example of a fluid that significantly expands when exposed to heat of more than 100 degrees Celsius.

Metals for use in the filler 220 include copper, nickel, silver or zinc, as these are highly heat conductive and reflective but not reactive with water. As the liquid in the filler 220 is heated (for example directly by an impinging laser beam or by the temperature of the ambient air that may have been heated by a laser beam), it expands to burst the microcapsule 210. Particularly, when the countermeasure device 240 is ejected into the path of a high energy laser beam, it is struck by the laser beam causing the liquid in the filler 220 to quickly boil, causing it to convert to gas and therefore expand. The relatively thin walls of the microcapsule 210 cannot contain the growing internal pressure, and so they break, dispersing the metal particles in the filler 220 and steam into the atmosphere through which the laser beam is passing. The originally suspended metal particles "bomb out" to form a cloud of metal particles.

A liquid constituent to the filler 220 is preferable over a gas, as it is more effective at dispersing the metal particles. However, it would be appreciated that the filler 220 may include a gas for causing the microcapsule 210 to burst when exposed to heat. The gas is selected such that it does not react with the metal particles also constituting the filler 220. The gas may be a noble gas, such as argon. Here, the microcapsule 210 is pressurised such that the expanding gas is more likely to cause it to rupture. The microcapsule 210 is pressurised such that its internal pressure exceeds the pressure of the air outside the microcapsule 210 (i.e. the local barometric pressure).

In some embodiments, the microcapsule 210 is provided with an explosive charge to cause the microcapsule 210 to burst once it has left the countermeasure dispenser 100. The explosive charge may be provided with a timed detonator such that the microcapsule 210 is caused to burst a predetermined distance from the ejection point. Alternatively, the explosive charge may be pressure sensitive, and therefore arranged to burst at a predetermined altitude. Instead of an explosive charge, a piercing or heating means may be provided. For example, the outside surface of the microcapsule may be coated in an exothermic substance which heats when exposed to air, thereby heating the filler 220 and/or damaging the wall of the microcapsule 210. Alternatively again, the microcapsule 210 skin material may be chosen to naturally disintegrate over time or when travelling at a high velocity.

In some embodiments, the countermeasure device 240 is equipped with a retardation device such as a parachute or other surface for increasing the air resistance of the microcapsule 210. Therefore, when the countermeasure device 240 is deployed or otherwise launched, it tends to descend relatively slowly, or remain in a particular region of airspace. This effect may be naturally provided without a retardation device if the microcapsules 210 are of the preferred dimensions previously described.

Figure 3:
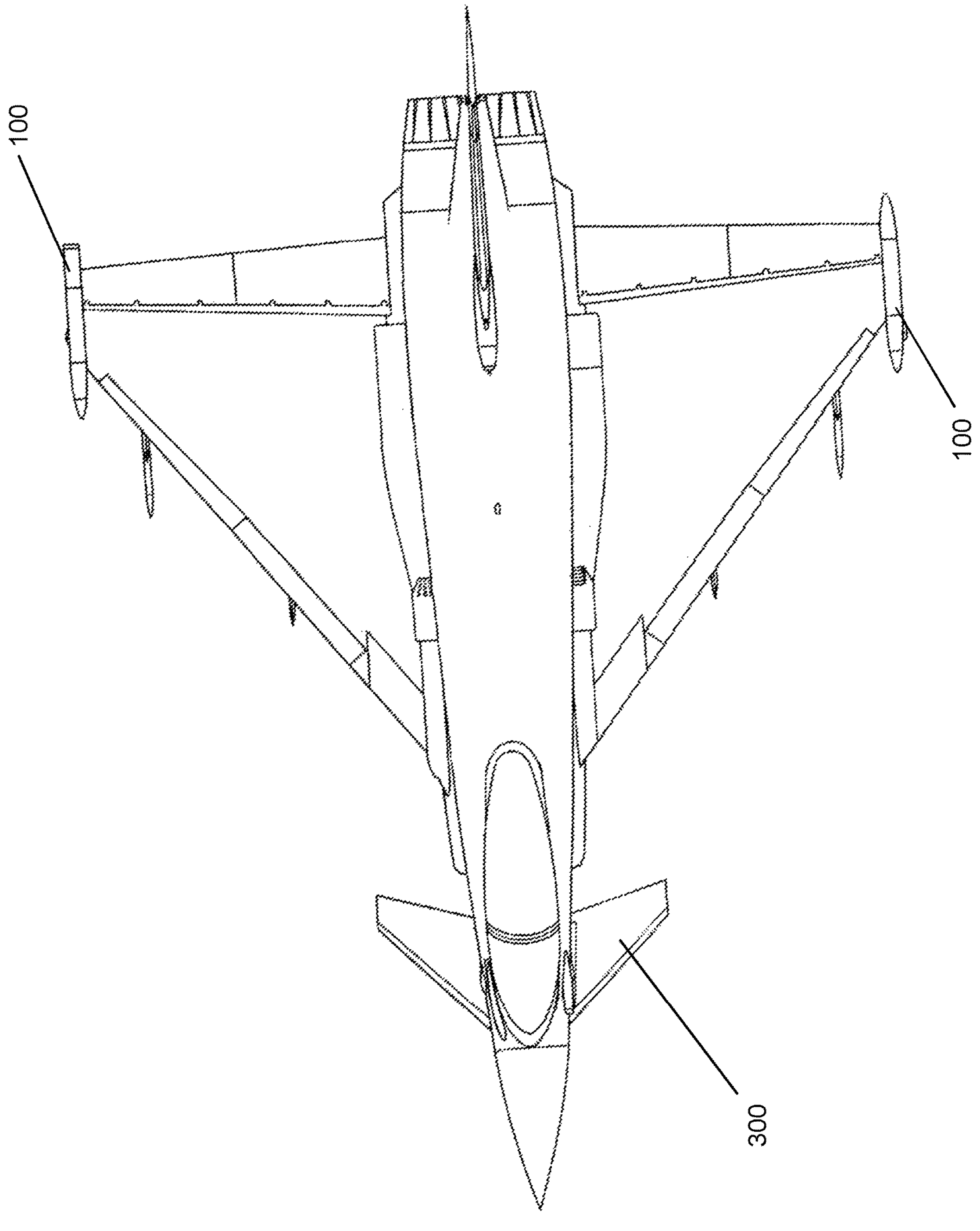
FIG. 3 shows an example aircraft comprising the countermeasure launcher.

FIG. 3 illustrates an example aircraft 300 comprising a plurality of countermeasure dispensers 100 as described above. The countermeasure dispensers 100 are located on the wingtips of the aircraft 300, however alternative locations are envisaged such as on the fuselage or tail of the aircraft 300. The countermeasure dispensers 100 may also be attached to payload pylons under the wings or fuselage of the aircraft 300. The aircraft 300 may comprise one or more countermeasure dispensers 100 containing the countermeasure devices 240.

While a fixed-wing aircraft 300 having the countermeasure dispensers 100 is illustrated, alternative embodiments provide other types of vehicles having one or more countermeasure dispensers 100. For example, the vehicle may comprise a surface ship, wheeled ground vehicle, tracked ground vehicle, spacefaring vessel, rotary-wing aircraft, or aerostat.

The countermeasure dispenser 100 may take the form of a cannon, mortar or missile launcher. In other words, the chamber 110 may be a gunbarrel and the previously described cartridge may be a shell packed with countermeasure devices 240. This tends to allow the countermeasure devices 240 to be launched to a greater range from the target being protected from incoming laser beams.

Figure 4A:
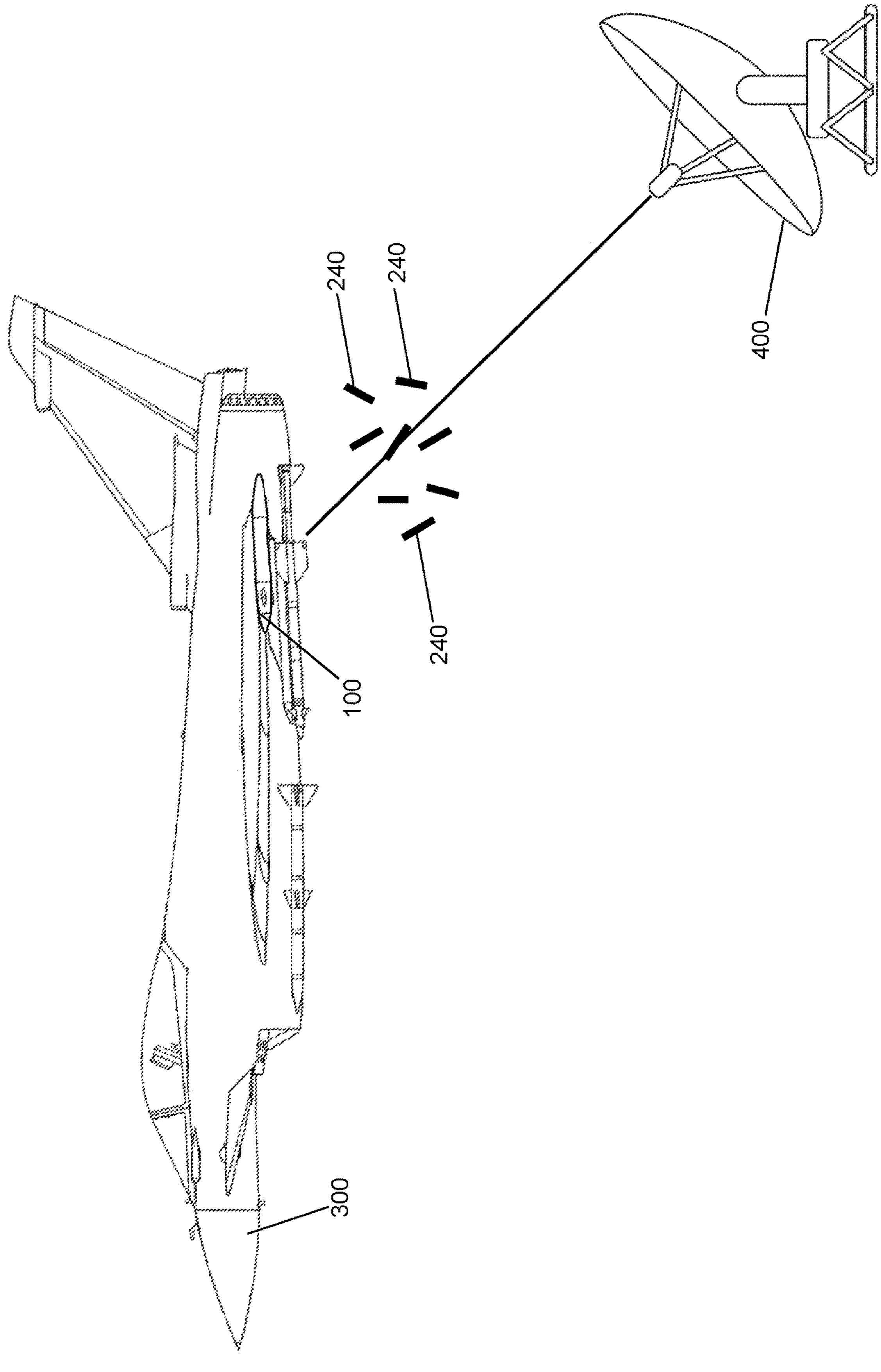
FIGS. 4*a* and 4*b* demonstrate the countermeasure in use.

A method of disrupting laser beams directed towards a target (i.e. a method of protecting a target from incoming laser beams) will now be described with reference to FIG. 4*a* and FIG. 4*b*. FIG. 4*a* illustrates an aircraft 300 having a countermeasure dispenser 100. As illustrated, a ground-based laser emitter 400 has targeted the aircraft 300 and fired a laser beam towards it. A sensor on-board the aircraft 300 detects the presence of the laser beam, and/or radar illumination. Alternatively, the pilot of the aircraft 300 may see the laser emitter 400 and decide to pre-emptively protect their aircraft 300. In response to the sensor detection or pilot command, the countermeasure dispenser 100 ejects a plurality of countermeasure devices 240 into the airflow. These are the countermeasure devices 240 described with reference to FIGS. 2*a* and 2*b*.

Alternatively, the countermeasure dispenser 100 may be configured to eject the countermeasure devices 240 when the aircraft 300 flies through an area in which a laser weapon is known to be, rather than in response to a laser weapon being fired at the aircraft 300. This threat location data may be based on intelligence information received from external assets (e.g. special forces or satellites) before or during the flight.

Figure 4B:
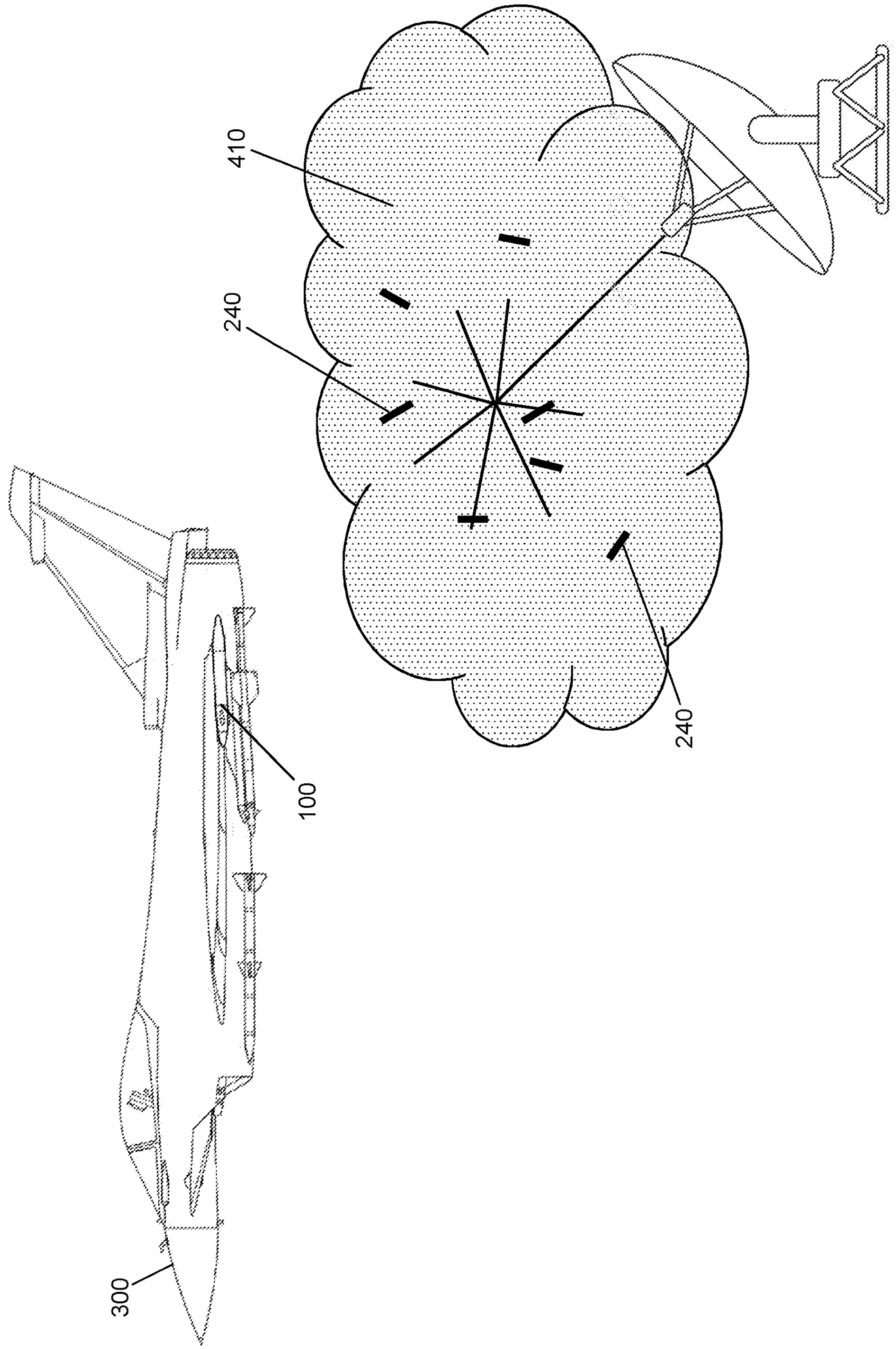

FIG. 4*b* illustrates the effect of the laser beam striking or otherwise heating one of the ejected countermeasure devices 240 as it descends through the path of the laser beam or into the vicinity of the laser beam. The laser beam heats the skin of the microcapsule 210, causing the heat-reactive component of the filler 220 (e.g. the water in which metal particles are suspended) inside the microcapsule 210 to rapidly expand. The rapid expansion of the filler 220 causes the microcapsule to burst. The metal particles disperse in the air to form a dense cloud 410 (or aerosol) of metal particles. The cloud 410 has a particle density of between about 1,000 parts $m^{-3}$ to about 50,000 $m^{-3}$. The metal particles are thermally conductive and reflective, and therefore disrupt the laser beam as it passes through the cloud 410. Further, the accelerating metal particles released from the burst microcapsule 210 may impact other microcapsules 210 in the area, causing tears in the skin of the other microcapsules 210 thereby causing them too to distribute their metal particles suspended in the filler 220.

As the cloud 410 of metal particles descends, metal particles may be deposited on the lens or other optical elements of the laser emitter 400, causing laser emitter 400 to be less effective through fouling (e.g. cracks, crazes, scratches or other contamination). In cases where the laser emitter 400 is aboard an airborne platform, the platform may fly through the cloud 410 as the platform follows the aircraft 300, again causing the metal particles to be deposited on the lens of the emitter 400 causing damage. In addition to fouling, the reflective particles deposited on the lens of the laser emitter 400 may cause an emitted laser beam to be immediately reflected back into the emitter 400, causing a self-destruct.

The countermeasure material described herein provides significant weight advantages over known countermeasure material/chaff. It is considered that the countermeasure material described herein (for example silicate glass fibre internally coated with aluminium) could be up to an order of magnitude lighter than its aluminium foil equivalent. For example, it is envisaged that 1 kg of the countermeasure material described herein may provide the same/similar volume coverage (and thus the same/similar effectiveness in radar detection avoidance) as up to 10 kg of conventional aluminium foil chaff. Further, the countermeasure material provides the dual purpose of defending a vehicle or area against both radar illumination and laser weaponry. The countermeasure material may damage the laser weaponry optics as a secondary effect.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to ca', can', 'first', 'second', etc. do not preclude a plurality. In the claims, the term 'comprising' or "including" does not exclude the presence of other elements.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A laser weapon countermeasure device, comprising:

a sealed capsule comprising a capsule wall having a filler disposed therein, the capsule wall being formed of a material or coated with a material which is configured to release the filler when exposed to air or laser beam, the material or coating heats when exposed to air or laser beam which heats the filler thereby releasing the filler or a material which disintegrates when the capsule is travelling at a speed greater than a threshold to release the filler, the filler comprising a precursor for a reflective metal or a precursor for a reflective metal alloy, the precursor comprises one of triethyl aluminium, a pyrophoric organometallic molecule, or a metal hydride, each of which form a reflective metal or reflective metal alloy when exposed to light.

2. The laser weapon countermeasure device according to claim 1, wherein the reflective metal or the reflective metal alloy comprises one of zinc, nickel, copper or silver particles.

3. The laser weapon countermeasure device according to claim 1, comprising a deployable retardation device arranged to, in use, slow the descent of the countermeasure device.

4. The laser weapon countermeasure device according to claim 1, wherein an inside surface of the capsule wall is at least partly coated in a reflective material and wherein the capsule wall further comprises a dielectric insulator.

5. The laser weapon countermeasure device according to claim 1, wherein the capsule wall has a thickness of between about 10 and 30 micrometres.

6. The laser weapon countermeasure device according to claim 1, wherein the capsule has a length proportional to a radio frequency of a radar signal, thereby the capsule is configured to re-radiate the radar signal.

7. A countermeasure launcher, the countermeasure launcher comprising a plurality of laser weapon countermeasure devices according to claim 1 and an ejection means.

8. The countermeasure launcher according to claim 7, comprising a chamber having at least one cartridge disposed therein, wherein each cartridge comprises a plurality of laser weapon countermeasure devices.

9. The countermeasure launcher according to claim 8, wherein each cartridge is independently ejectable from the chamber.

10. A vehicle comprising the countermeasure launcher according to claim 7.

11. The vehicle according to claim 10, wherein the vehicle comprises an aircraft.

* * * * *